United States Patent
Awano et al.

(10) Patent No.: US 9,585,035 B2
(45) Date of Patent: Feb. 28, 2017

(54) MOBILE TERMINAL TEST APPARATUS AND PARAMETER REPLACEMENT METHOD FOR USE IN MOBILE TERMINAL TEST APPARATUS

(71) Applicant: ANRITSU CORPORATION, Kanagawa (JP)

(72) Inventors: Takayuki Awano, Kanagawa (JP); Yuki Higuchi, Kanagawa (JP); Daiki Kano, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 14/948,820

(22) Filed: Nov. 23, 2015

(65) Prior Publication Data

US 2016/0165495 A1   Jun. 9, 2016

(30) Foreign Application Priority Data

Dec. 5, 2014   (JP) .................................. 2014-246891

(51) Int. Cl.
| | |
|---|---|
| H04W 24/00 | (2009.01) |
| H04W 24/06 | (2009.01) |
| H04L 5/00 | (2006.01) |
| H04W 36/00 | (2009.01) |
| H04W 36/06 | (2009.01) |

(52) U.S. Cl.
CPC ............. *H04W 24/06* (2013.01); *H04L 5/001* (2013.01); *H04W 36/0055* (2013.01); *H04W 36/06* (2013.01)

(58) Field of Classification Search
CPC ..... H04W 24/02; H04W 24/04; H04W 24/06; H04W 36/005; H04W 36/0061; H04W 36/0066
USPC .... 455/414.1, 423, 424, 425, 436, 437, 438, 455/452.1, 452.2, 453
See application file for complete search history.

(56) References Cited

U.S. PATENT DOCUMENTS

| | | | |
|---|---|---|---|
| 7,889,663 B1 * | 2/2011 | Wright ................... | H04W 24/06 370/241 |
| 9,054,921 B2 * | 6/2015 | Mayer ..................... | H04L 27/12 |
| 9,118,534 B2 * | 8/2015 | Mayer ................ | H04L 27/2657 |
| 2010/0093285 A1 * | 4/2010 | Wang ................. | H04B 17/3912 455/67.11 |

(Continued)

FOREIGN PATENT DOCUMENTS

JP   2014027656 A   2/2014

*Primary Examiner* — Jean Gelin
(74) *Attorney, Agent, or Firm* — Pearne & Gordon LLP (57) ABSTRACT

Provided is a mobile terminal test apparatus that can shorten a carrier aggregation testing time. The mobile terminal test apparatus includes a call processing units 12-0 to 12-*n* that transmits and receives a wireless signal between each of the call processing units 12-0 to 12-*n* and a mobile terminal 2, and makes a call connection suitable for testing conditions as a component carrier between each of the call processing units 12-0 to 12-*n* and the mobile terminal 2, and a control unit 15 that causes the mobile terminal 2 to perform a handover, and that applies parameters for a SCC that is designated, as parameters for a PCC that is a handover destination, to the call processing unit 12-0 that corresponds to a PCC, and applies parameters for the pre-handover PCC to the call processing unit 12-*n* that corresponds to the SCC that are designated and thus connects the SCC.

7 Claims, 4 Drawing Sheets

(56) References Cited

U.S. PATENT DOCUMENTS

| | | | | |
|---|---|---|---|---|
| 2011/0084887 A1* | 4/2011 | Mow | ...................... | G01R 29/10 343/703 |
| 2011/0237199 A1* | 9/2011 | Venkataraman | ....... | H04B 17/24 455/67.11 |
| 2012/0045998 A1* | 2/2012 | Hsiao | ................. | H04B 17/0085 455/67.14 |
| 2013/0017841 A1* | 1/2013 | Kazmi | ................. | G01S 5/0236 455/456.1 |
| 2014/0016593 A1* | 1/2014 | Park | ........................ | H04L 5/001 370/329 |
| 2014/0029440 A1* | 1/2014 | Genoud | ................. | H04L 5/001 370/241 |
| 2014/0056165 A1* | 2/2014 | Siomina | ............... | H04B 1/7083 370/252 |
| 2014/0119224 A1* | 5/2014 | Keskitalo | .............. | H04W 24/10 370/252 |
| 2014/0256268 A1* | 9/2014 | Olgaard | ................. | H04B 17/00 455/67.13 |
| 2014/0293818 A1* | 10/2014 | Sesia | .................... | H04B 17/318 370/252 |
| 2014/0323059 A1* | 10/2014 | Wakasa | ................. | H04B 17/23 455/67.14 |
| 2015/0140956 A1* | 5/2015 | Prewitt, II | ............ | H04M 3/362 455/405 |
| 2015/0173094 A1* | 6/2015 | Vangala | ................. | H04L 5/001 370/329 |
| 2015/0264591 A1* | 9/2015 | Baeder | ................. | H04W 24/08 370/252 |

* cited by examiner

FIG.1

| Parameter name | Contents |
|---|---|
| Frame Structure | Duplex mode is set. |
| Channel Bandwidth | Channel bandwidth is set. |
| UL Channel | Uplink channel is set. |
| DL Channel | Downlink channel is set. |
| Operation Band | Operation band is set. |
| Output Level (Total) | Total output level of all channels output is set. |
| External Loss | External loss is set to ON or OFF. |
| UL RMC | Parameters relating to RMC of uplink signal are set. |
| DL RMC | Parameters relating to RMC of downlink signal are set. |
| CFI | CFI is set. |
| Uplink Downlink Configuration | A method of allocating uplink signal, downlink signal, or the like in subframe in case of TDD is set. |
| Special Subframe Configuration | Configuration pattern of special subframe for avoiding collision between uplink signal and downlink signal in case of TDD is set. |
| Ratio of power of downlink signal to reference signal in each physical channel | A ratio of output power of downlink signal to reference signal in each physical channel is set. |
| CC broadcasting information | Contents of broadcast information for broadcasting CC information to mobile terminal are set. |

MOBILE TERMINAL TEST APPARATUS AND PARAMETER REPLACEMENT METHOD FOR USE IN MOBILE TERMINAL TEST APPARATUS

TECHNICAL FIELD

The present invention relates to a mobile terminal test apparatus that performs testing of a mobile communication terminal.

BACKGROUND ART

In a case where mobile communication terminals such as a portable telephone and a data communication terminal are developed, there is a need to test whether or not these mobile communication terminals perform communication normally. For this reason, a mobile communication terminal that is a testing target is connected to a test apparatus that operates as a pseudo-base station that has a functional resemblance to an actual base station, and communication is performed between the test apparatus and the mobile communication terminal. Thus, testing is performed for checking contents of the communication.

Furthermore, in the 3rd Generation Partnership Project (3GPP) in which wireless communication standards are created, among standards for Long Term Evolution-Advanced (LTE-A), a carrier aggregation technology is introduced. This carrier aggregation achieves an improvement in transfer speed by performing communication using multiple LTE carriers at the same time.

A test apparatus that is capable of performing carrier aggregation testing is disclosed in Patent Document 1.

RELATED ART DOCUMENT

Patent Document

[Patent Document 1] Japanese Unexamined Patent Application No. 2014-27656

DISCLOSURE OF THE INVENTION

Problem that the Invention is to Solve

In standards in 3GPP Releases 10 or later, measurement standards for performing evaluation of a transmission signal or a reception signal in a call connection state of a carrier aggregation are defined. In these measurement standards, on the condition that an LTE carrier called a component carrier (hereinafter referred to as a CC) is configured from a predetermined reference measurement channel (RMC), there is a need to perform transmission testing and reception testing both in a state where the LTE carrier is a primary component carrier (hereinafter referred to as a PCC) and in a state where the LTE carrier is a secondary component carrier (hereinafter referred to as an SCC).

Moreover, the PCC is a CC that is necessary for a mobile communication terminal to maintain a connection to a base station. The SCC is a CC that is used for improving transfer speed between the mobile communication terminal and the base station, and is a CC that accompanies the PCC.

In a case where, in performing the testing described above, the testing in a PCC state and the testing in an SCC state are switched, in the mobile terminal test apparatus that operates as a pseudo base station, a connection to the CC is temporarily released, setting of each parameter for the test apparatus, necessary for a testing condition is performed, a CC call connection has to start over, it takes time to perform the testing, and a testing time becomes long.

Here, an object of the present invention is to provide a mobile terminal test apparatus that can improve simplicity of carrier aggregation testing and shorten a testing time by making it easy to replace setting parameters for a PCC or for an SCC.

Means for Solving the Problem

According to an aspect of the present invention, there is provided a mobile terminal test apparatus that, based on parameters that are set for each of multiple component carriers in a carrier aggregation, performs a call connection to a mobile terminal and performs carrier aggregation testing, with one among the multiple component carriers being set to be a primary component carrier and with the other component carriers being set to be secondary component carriers, the mobile terminal test apparatus including: a control unit that causes the mobile terminal to perform a handover, and that connects one component carrier, which is connected as the secondary component carrier before the handover is performed, as the primary component carrier based on parameters that are set for the secondary component carrier, and connects a component carrier, which is connected as the primary component carrier before the handover is performed, as the secondary component carrier based on the parameters that are set for the primary component carrier.

With this configuration, by performing the handover, setting parameters for a PCC and for an SCC are replaced while a call connection is being maintained. For this reason, the replacement of the setting parameters for the PCC and for the SCC is made easy, and thus simplicity of carrier aggregation testing can be improved and a testing time can be shortened.

Furthermore, in the mobile terminal test apparatus according to the aspect of the present invention, the control unit may stop output of the secondary component carrier before the handover is performed.

With this configuration, a secondary component carrier signal can be prevented from interfering with a primary component carrier signal, and the handover is reliably performed and thus the testing time can be shortened.

Furthermore, in the mobile terminal test apparatus according to the aspect of the present invention, the control unit may change a transmission and reception level of the primary component carrier before the handover is performed.

With this configuration, the transmission and reception level of the primary component carrier can be changed to a level suitable for signaling, and the handover is reliably performed and thus the testing time can be shortened.

Furthermore, in the mobile terminal test apparatus according to the aspect of the present invention, the control unit may perform the handover and replace some parameters that are set for one component carrier among the secondary component carriers by some parameters that are set for the primary component carrier.

With this configuration, the processing terminates with replacement of only some of the parameters, and the testing time can be shortened.

According to another aspect of the present invention, there is provided a parameter replacement method for use in a mobile terminal test apparatus that, based on parameters that are set for each of multiple component carriers in a carrier aggregation, performs a call connection to a mobile terminal and performs carrier aggregation testing, with one among the multiple component carriers being set to be a primary component carrier and with the other component carriers being set to be secondary component carriers, the parameter replacement method including: transmitting a handover message to the mobile terminal; connecting one component carrier, which is connected as the multiple secondary component carriers before the handover is performed, as the primary component carrier based on parameters that are set for the secondary component carrier; and connecting a component carrier, which is connected as the primary component carrier before the handover is performed, as the secondary component carrier based on the parameters that are set for the primary component carrier.

With this configuration, by performing the handover, the setting parameters for the PCC and for the SCC are replaced while the call connection is being maintained, and a connection to the mobile terminal is made. For this reason, the replacement of the setting parameters for the PCC and for the SCC is made easy, and thus simplicity of carrier aggregation testing can be improved and a testing time can be shortened.

Furthermore, the parameter replacement method according to the aspect of the present invention may further include stopping output of the secondary component carrier before the handover message is transmitted to the mobile terminal.

With this configuration, a secondary component carrier signal can be prevented from interfering with a primary component carrier signal, and the handover is reliably performed and thus the testing time can be shortened.

Furthermore, the parameter replacement method according to the aspect of the present invention may further include changing a transmission and reception level of the primary component carrier before the handover message is transmitted to the mobile terminal.

With this configuration, a transmission and reception level of the primary component carrier can be changed to a level suitable for signaling, and the handover is reliably performed and thus the testing time can be shortened.

Advantage of the Invention

According to the present invention, a mobile terminal test apparatus can be provided that can improve simplicity of carrier aggregation testing and shorten a testing time by making it easy to replace setting parameters for a PCC or for an SCC.

BEST MODE FOR CARRYING OUT THE INVENTION

Figure 1:
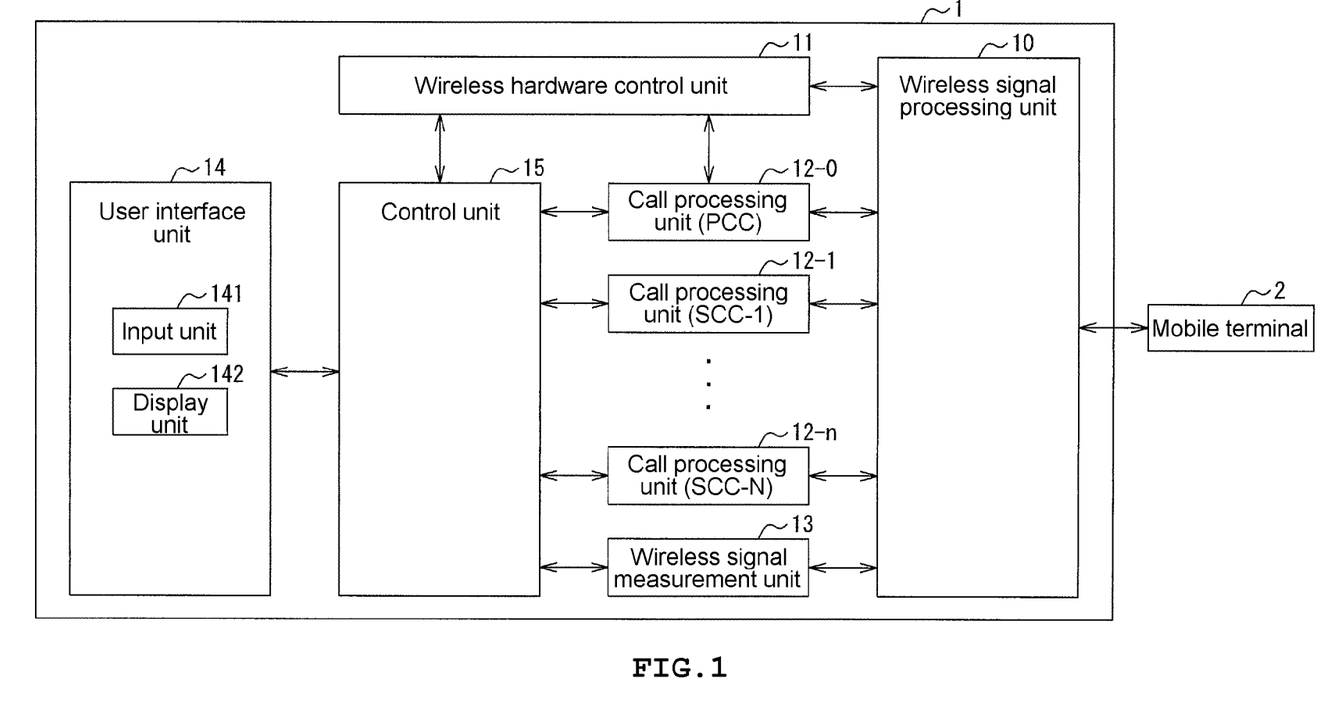
FIG. 1 is a block diagram of a mobile terminal test apparatus according to an embodiment of the present invention.

Embodiments of the present invention will be described in detail referring to the drawings. In FIG. 1, a mobile terminal test apparatus 1 according to one embodiment of the present invention is set to transmit and receive a wireless signal to and from a mobile terminal 2 in a wired manner through a coaxial cable or the like, as a pseudo-base station. Moreover, the mobile terminal test apparatus 1 may be set to transmit and receive a signal to and from the mobile terminal 2 in a wireless manner through an antenna. The mobile terminal test apparatus 1 supports LTE-A standards, and is enabled to perform communication between the mobile terminal test apparatus 1 and the mobile terminal 2, using a carrier aggregation technology.

The mobile terminal test apparatus 1 is configured to include a wireless signal processing unit 10, a wireless hardware control unit 11, multiple call processing units 12-0 to 12-$n$, a wireless signal measurement unit 13, a user interface unit 14, and a control unit 15.

The wireless signal processing unit 10 transmits and receives a wireless signal between the wireless signal processing unit 10 and the mobile terminal 2. The wireless signal processing unit 10 performs coding, modulation, frequency conversion, and the like on transmission data of each of the call processing units 12-0 to 12-$n$, and generates and transmits the resulting wireless signal. Furthermore, the wireless signal processing unit 10 performs frequency conversion, demodulation, decoding, and the like on the wireless signal that is received from the mobile terminal 2, and outputs the result to each of the call processing units 12-0 to 12-$n$.

The wireless hardware control unit 11 controls the wireless signal processing unit 10, and thus controls a transmission and reception level of or a frequency of a wireless signal.

Each of the call processing units 12-0 to 12-$n$ is connected to the wireless signal processing unit 10 and the wireless hardware control unit 11. Each of the call processing units 12-0 to 12-$n$ transmits a setting signal to the wireless hardware control unit 11 according to parameters that are set, and transmits a wireless signal suitable for testing conditions to the wireless signal processing unit 10. Furthermore, each of the call processing units 12-0 to 12-$n$ transmits and receives a wireless signal between each of the call processing units 12-0 to 12-$n$ and the mobile terminal 2 through the wireless signal processing unit 10, and makes a call connection suitable for the testing conditions as a component carrier between each of the call processing units 12-0 to 12-$n$ and the mobile terminal 2 or performs a call control as a component carrier that corresponds to the testing conditions. That is, one of the call processing units 12-0 to 12-$n$ operates as one component carrier.

The mobile terminal test apparatus 1 according to the present embodiment includes the multiple call processing units 12-0 to 12-$n$, and is set to correspond to a carrier aggregation that results from the multiple component carriers.

The wireless signal measurement unit 13 is connected to the wireless signal processing unit 10. The wireless signal measurement unit 13 is set to measure a transmission and reception level of, an error vector magnitude (EVM), or the like of a wireless signal that is transmitted and received by the wireless signal processing unit 10, and is set to output a result of the measurement to the control unit 15. The control unit 15 stores a result of the measurement by the wireless signal measurement unit 13, in a hard disk or the like, in a state of being associated with time information and the like. At the request of a user, the control unit 15 is set to output the result of the measurement to the user interface unit 14 for display, or is set to output the result of the measurement, as a log, to a file.

The user interface unit 14 includes an input unit 141 that receives an operation input from the user, and a display unit 142 on which a screen for setting testing parameters, the result of the measurement by the wireless signal measurement unit 13, or the like is displayed. The input unit 141 is configured as a touchpad, a keyboard, a push button, or the like. The display unit 142 is configured as a liquid crystal display device or the like.

The control unit 15 is configured as a computer unit that includes a central processing unit (CPU) that is not illustrated, a random access memory (RAM), a read only memory (ROM), a hard disk drive, and input and output Along with various control constants, various maps, or the like, a program for causing the computer unit to function as the control unit 15 is stored in the ROM and the hard disk drive of the control unit 15. That is, in the control unit 15, the CPU executes the program that is stored in the ROM and the hard disk drive, and thus the computer unit functions as the control unit 15.

The wireless hardware control unit 11, the call processing units 12-0 to 12-n, the wireless signal measurement unit 13, and the user interface unit 14 are connected to the input and output ports of the control unit 15. Each unit of the control unit 15 is enabled to transmit and receive a signal.

Moreover, according to the present embodiment, the wireless hardware control unit 11, the call processing units 12-0 to 12-n, and the wireless signal measurement unit 13 are configured as a processor, such as a digital signal processor, which is programmed to perform each processing. Furthermore, the wireless signal processing unit 10 is configured as a communication module.

Based on parameters that are set according to a parameter setting screen that is displayed on the display unit 142, the control unit 15 transmits a setting signal to the wireless hardware control unit 11 and thus causes the wireless signal processing unit 10 to control parameters for a wireless signal, or notifies each of the call processing units 12-0 to 12-n of the setting signal, controls CC parameters, and thus performs setting for testing. Thus, the control unit 15 is set to perform call connection suitable for parameters that are set, between the mobile terminal test apparatus 1 and the mobile terminal 2, and is set to cause the wireless signal measurement unit 13 to measure the wireless signal that is transmitted and received between the mobile terminal test apparatus 1 and the mobile terminal 2.

Furthermore, according to an instruction that is input into the input unit 141, the control unit 15 transmits a signal to the wireless hardware control unit 11 and the call processing units 12-0 to 12-n and is set to perform call control for testing.

Specifically, first, setting of the CC parameters that are used for testing is performed by the user. When a parameter setting function is selected by the user operating the input unit 141, for example, the control unit 15 displays the parameter setting screen on the display unit 142, and sets parameters as illustrated in FIG. 2.

Figure 2:
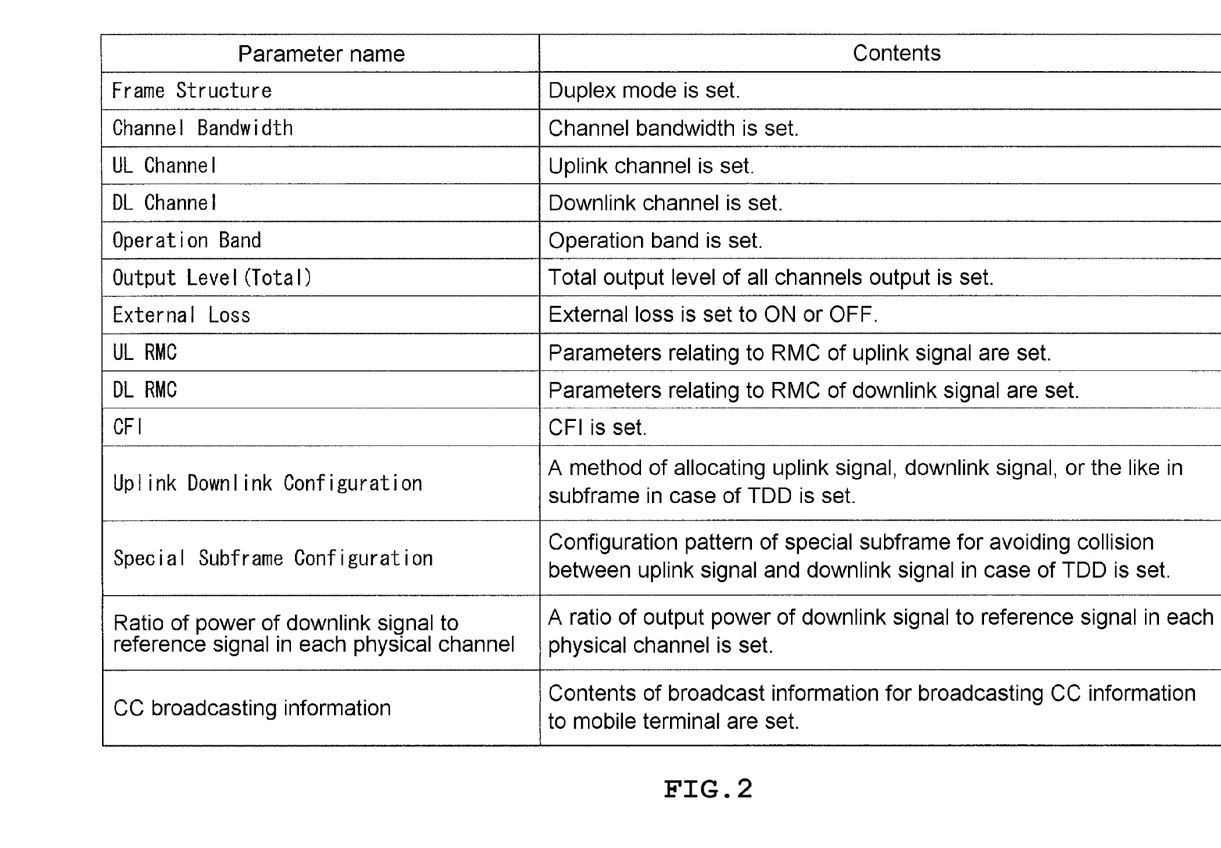
FIG. 2 is a diagram illustrating examples of parameters that are set for a component carrier for the mobile terminal test apparatus according to the embodiment of the present invention.

In FIG. 2, "Frame Structure" indicates a duplex mode. According to the present embodiment, "Frame Structure" is selected from among frequency division duplex (FDD) and time division duplex (TDD). Moreover, an initial value of "Frame Structure" is set to "FDD".

"Channel Bandwidth" indicates a channel bandwidth, and is selected from among "1.4 MHz", "3 MHz", "5 MHz", "10 MHz", "15 MHz", and "20 MHz". Moreover, an initial value of "Channel Bandwidth" is set to "5 MHz".

"UL Channel" indicates an uplink channel (a link from mobile terminal 2 to the mobile terminal test apparatus 1), and a setting range from "0" to "65535" is stipulated for "UL Channel". Moreover, an initial value of "UL Channel" is set to "18300".

"DL Channel" indicates a downlink channel (a link from the mobile terminal test apparatus 1 to the mobile terminal 2), and a setting range from "0" to "65535" is stipulated for "DL Channel". Moreover, an initial value of DL Channel" is set to "300".

"Operation Band" indicates an operation band, and a setting range from to "43" is stipulated for "Operation Band". Moreover, an initial value of "Operation Band" is set to "1".

"Output Level" indicates a total of all channel output level values, and a setting range from "−120.0 dBm" to "−10.0 dBm" is stipulated for "Output Level". Moreover, an initial value of "Output Level" is set to "−60.2 dBm".

"External Loss" indicates a state of an external loss, and is selected from among "ON", "OFF", and "COMMON". Moreover, an initial value of "External Loss" is set to "OFF".

"UL RMC" indicates a group of parameters relating to an RMC of an uplink signal, and includes the following parameters: "Number of RB, "Starting RB", "RB Pos.", "MCS Index", and "Modulation".

"Number of RB" indicates the number of resource blocks (RBs) that are allocated, and a setting range from "0" to "100" is stipulated for "Number of RB". Moreover, an initial value of "Number of RB" is set to "25".

"Starting RB" indicates a starting number of an RB, and a setting range from "0" to "99" is stipulated for "Starting RB". Moreover, an initial value of "Starting RB" is set to "0".

"RB Pos." indicates a position to which an RB is allocated, and is selected from among "MIN", "MID", and "MAX". Moreover, an initial value of "RB Pos." is set to "MIN".

"MCS Index" indicates an index of a modulation and coding scheme (MCS), and a setting range from "0" to "28" is stipulated for "MCS Index". Moreover, an initial value of "MCS Index" is set to "5". Furthermore, as a value of "Modulation" or the like is changed, a setting value of "MCS Index" is also changed.

"Modulation" indicates a modulation scheme, and is selected from among "Quadrature Phase Shift Keying (QPSK)" and "16 Quadrature Amplitude Modulation (16QAM)". Moreover, an initial value of "Modulation" is set to "QPSK". Furthermore, as a value of "MCS Index" or the like is changed, a setting value of "Modulation" is also changed.

"DL RMC" indicates a group of parameters relating to an RMC of a downlink signal, and, like "UL RMC" described above, includes the following parameters: "Number of RB", "Starting RB" "RB Pos.", "MCS Index", and "Modulation".

"CFI" indicates a control format indicator (CFI) indicating the number of orthogonal frequency-division multiplexing (OFDM) symbols that can be allocated to a control channel in the downlink signal.

"Uplink Downlink Configuration" indicates a method in which the subframe is allocated to the uplink signal, the downlink signal, or the like is allocated in a case where the duplex mode is TDD, and a setting range from "0" to "6" is stipulated for "Uplink Downlink Configuration".

"Special Subframe Configuration" indicates a configuration pattern of a special subframe for avoiding a collision between the uplink signal and the downlink signal in the case where the duplex mode is the TDD, and a setting range from "0" to "8" is stipulated for "Special Subframe Configuration".

A "ratio of a power of downlink signal to a reference signal in each physical channel" indicates a ratio of an output power of a downlink signal to a reference signal in each physical channel (Physical Broadcast Channel (PBCH), a Physical Downlink Shared Channel (PDSCH), or the like).

"CC broadcast information" indicates contents of broadcast information for broadcasting CC information to the mobile terminal 2 for every CC. Moreover, initial values of and a setting range of various parameters that are described above as examples are ones that are available at a current point in time, and can be increased from now on.

The user sets the parameters as described above for every CC in terms of intended testing. The control unit stores the parameters, as described above, which are set, in the hard disk drive for every CC, notifies a corresponding one, among the call processing units 12-0 to 12-$n$, of the parameters, and enables the corresponding one, among the call processing units 12-0 to 12-$n$, to perform CC control according to the parameters that are set.

Moreover, the parameters described above are typical parameters that are set for the mobile terminal test apparatus 1. In this manner, because the number of parameter types, that is, the number of setting items is increased in the mobile terminal test apparatus 1, it is a very complicated task for the user to set the parameters for the mobile terminal test apparatus 1.

After the parameters described above are set, the user connects the mobile terminal test apparatus 1 and the mobile terminal 2 in a wired manner, performs location registration by performing a task such as powering on the mobile terminal 2, and checks whether or not the location registration is performed in a normal manner at the mobile terminal test apparatus 1 side. Moreover, a connection may be established in a wireless manner between the mobile terminal test apparatus 1 and the mobile terminal 2.

When the user performs an operation of making a call connection by operating the input unit 141 in a state where the location registration is performed, the control unit 15 transmits an instruction to make the call connection, to the call processing unit 12-0 that corresponds to a CC that is designated by the user, and performs the call connection.

When the user performs an operation of conducting transmission testing by operating the input unit 141 in a state where the call connection is performed, the control unit 15 transmits an instruction to conduct the testing to the wireless signal measurement unit 13, and performs testing of a transmission signal. When receiving information on a testing result from the wireless signal measurement unit 13, the control unit 15 stores the information, as a log, in the hard disk drive, and displays the testing result and the like on the display unit 142.

Furthermore, when the user performs an operation of conducting reception testing by operating the input unit 141 in the state where the call connection is performed, the control unit 15 transmits an instruction to conduct the testing to the call processing unit 12-0 that is call-connected and that corresponds to a CC, and performs testing of a reception signal. When receiving information on a testing result from the call processing unit 12-0, the control unit 15 stores the information, as a log, in the hard disk drive, and displays the result and the like on the display unit 142.

In a case where the mobile terminal test apparatus 1 described above performs carrier aggregation testing, the user performs setting of parameters for a CC as a PCC and setting of parameters for CCs as one or more SCCs, connects the mobile terminal test apparatus 1 and the mobile terminal 2, and performs the location registration.

When the user performs the operation of making a call connection by operating the input unit 141 in the state where the location registration is performed, the control unit 15 transmits the instruction to make the call connection, to the call processing unit 12-0 that corresponds to the CC that is set as the PCC, and performs the call connection.

Thereafter, when the user performs an operation of making an SCC call connection by operating the input unit 141, the control unit 15 transmits an instruction to make the SCC call connection, to the call processing unit 12-0 that corresponds to the CC that is set as the PCC, transmits the instruction to make the call connection, to the call processing unit 12-1 that corresponds to the CC that is set as the SCC, and performs the call connection.

Additionally, when the user performs the operation of making the SCC call connection by operating the input unit 141, the control unit 15 transmits the instruction to make the SCC call connection, to the call processing unit 12-0 that corresponds to the CC that is set as the PCC, transmits the instruction to make the call connection, to the call processing unit 12-2 that corresponds to the CC that is set as the SCC, and performs the call connection.

In this manner, the user performs the call connection with the PCC and the SCC that comply with the testing conditions, and performs transmission testing and reception testing in a state of the PCC that is configured from the RMC that is set with parameters.

At this point, in standards in 3GPP Releases 10 or later, there is a need to perform both testing in the state of the PCC and testing in a state of the SCC on the same RMC. When this starts over from the setting of the parameters, the testing becomes complicated, and a testing time becomes long.

The mobile terminal test apparatus 1 according to the present embodiment is enabled to use a handover function, and to replace parameters for the PCC and parameters for the SCC.

When a PCC and an SCC-N, parameters for which are replaced, are designated by the user operating the input unit 141, and an operation of performing handover is performed, the control unit 15 notifies one, among the call processing units 12-0 to 12-$n$, that corresponds to the PCC and the SCC-N, parameters for which are replaced, of the replaced parameters, and enables the call processing unit 12 to perform the CC control according to parameters that are set. That is, the call processing unit 12-0 is notified of parameters that are set for the call processing unit 12-$n$, and the call processing unit 12-$n$ is notified of parameters that are for the call processing unit 12-0.

Moreover, the parameters that are replaced, for example, may be some of the parameters that are illustrated in FIG. 2. Accordingly, because with replacement of only some of the parameters, the processing terminates, the testing time can be shortened. Furthermore, in a case where some of the parameters are replaced, the control unit 15 may notify the call processing unit 12-0 and 12-$n$ of only the parameters that are replaced. Accordingly, an amount of information that is transferred from the control unit 15 to the call processing units 12-0 to 12-$n$ can be reduced.

Then, the control unit 15 transmits a handover starting instruction to the call processing unit 12-0 that corresponds to the PCC, and causes a handover message to be transmitted to the mobile terminal 2.

After the handover message is transmitted to the mobile terminal 2, when a message that requests a connection to a CC that is a handover destination is received from the mobile terminal 2, the call processing unit 12-0 that corresponds to the PCC transmits a response message that is based on parameters (parameters that are set for the call processing unit **12-*n*) that are notified from the control unit 15. When a connection request signal is received from the mobile terminal 2, the call processing unit 12-0 performs a call connection to the PCC based on the parameters that are notified from the control unit 15**.

Thereafter, the call processing unit 12-0 that corresponds to the PCC transmits an SCC reconfiguration instruction to one, among the call processing units 12-1 to **12-*n*, which corresponds to the SCC, and performs the SCC call connection. At this time, the call processing unit 12-*n* performs the SCC call connection based on the parameters that are set for the call processing unit 12-0 and that are notified from the control unit 15**.

In this manner, because the parameters for the PCC and for the SCC are replaced using a handover from a call connection state, when PCC testing and SCC testing are exchanged, the mobile terminal test apparatus 1 can improve simplicity of the testing and can shorten the testing time without the need for the processing to start over from the setting of the parameters.

Figure 3:
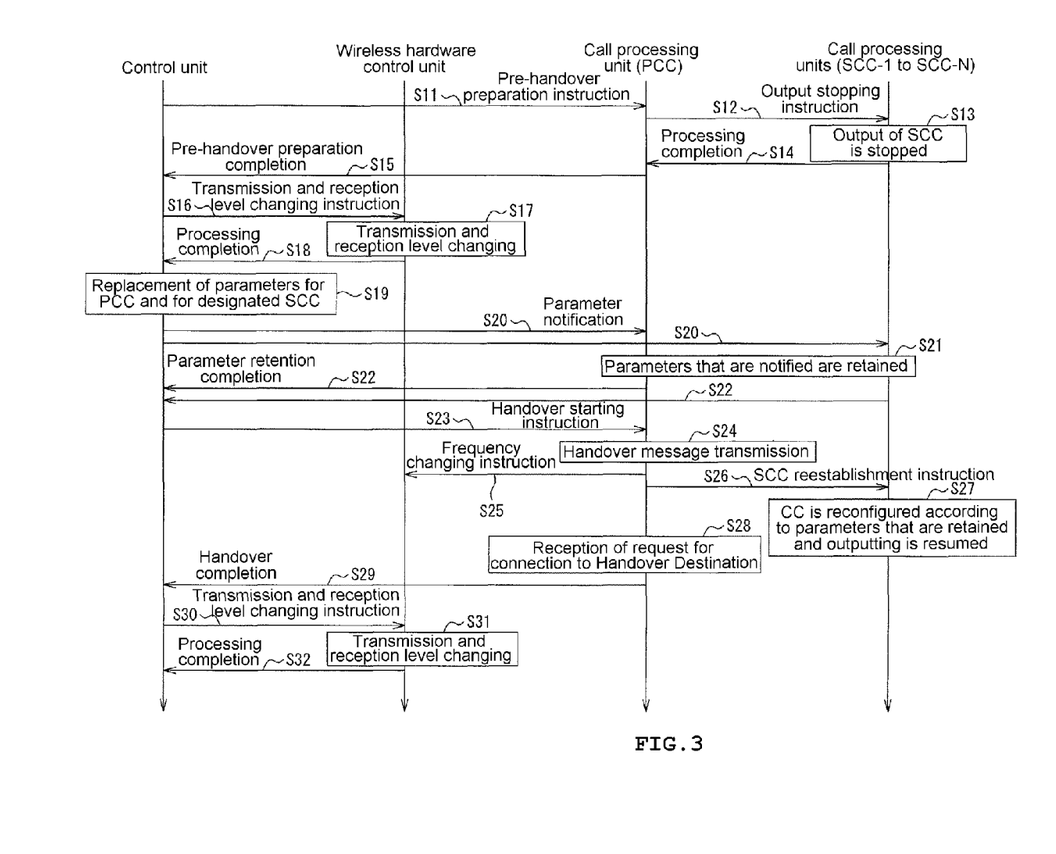
FIG. 3 is a sequence diagram illustrating a parameter replacement processing in the mobile terminal test apparatus according to the embodiment of the present invention.

A parameter replacement processing by the mobile terminal test apparatus 1 with the configuration described above according to the present embodiment is described referring to FIG. 3.

As illustrated in FIG. 3, when an operation for handover performance is performed by the user operating the input unit 141, the control unit 15 transmits a "pre-handover preparation instruction" to the call processing unit 12-0 that corresponds to a PCC (Step S11).

When the "pre-handover preparation instruction" is received, the call processing unit 12-0 transmits an "output stopping instruction" to one, among the call processing units 12-1 to **12-*n* (Step S12**), which corresponds to the SCC.

When receiving the "output stopping instruction", one, among the call processing units 12-1 to **12-*n*, which corresponds to the SCC, stops output of the corresponding SCC (Step S13**). This is done in order that an influence on signaling by a PCC signal due to interference of an SCC signal cannot take place.

When stopping output of the corresponding SCC, one, among the call processing unit 12-1 to **12-*n* that correspond to the SCC, which corresponds to the SCC, transmits "processing completion" to the call processing unit 12-0 that corresponds to the PCC (Step S14**).

When receiving the "processing completion" from one, among the call processing units 12-1 to **12-*n*, which corresponds to all the SCCs, the call processing unit 12-0 that corresponds to the PCC transmits "pre-handover preparation completion" to the control unit 15 (Step S15**).

When receiving the "pre-handover preparation completion" from the call processing unit 12-0 that corresponds to the PCC, the control unit 15 transmits a "transmission and reception level changing instruction" to the wireless hardware control unit 11 (Step S16). This is done in order to optimize a PCC transmission and reception level for signaling.

When receiving the "transmission and reception level changing instruction" from the control unit 15, the wireless hardware control unit 11 changes a transmission and reception level to a level that is assigned (Step S17). When completing the changing, the wireless hardware control unit 11 transmits the "processing completion" to the control unit 15 (Step S18).

When receiving the "processing completion" from the wireless hardware control unit 11, the control unit 15 replaces parameters for the PCC and parameters for the SCC-N that is designated by the user (Step S19), and transmits "parameter notification" as past handover parameters, which include the replaced parameters, to one, among the call processing units 12-0 to **12-*n*, which corresponds to all the parameters for the PCC and for the SCC (Step S20**).

When receiving the "parameter notification" from the control unit 15, one, among the call processing units 12-0 to **12-*n*, retains the received parameters in the RAM of the one, among the call processing units 12-0 to 12-*n* (Step S21). Having completed the retaining, the one, among the call processing units 12-0 to 12-*n*, transmits "parameter retention completion" to the control unit 15 (Step S22**).

When receiving the "parameter retention completion" from all the call processing units 12-0 to **12-*n*, the control unit 15 transmits a "handover starting instruction" to the call processing unit 12-0 that corresponds to the PCC (Step S23**).

When receiving the "handover starting instruction" from the control unit 15, the call processing unit 12-0 that corresponds to the PCC transmits a handover message to the mobile terminal 2 (Step S24), transmits a "frequency changing instruction" that changes all frequencies for the PCC and for the SCC, to the wireless hardware control unit 11 (Step S25), and transmits an "SCC reconfiguration instruction" that re-connects the SCC to one, among the call processing units 12-1 to **12-*n*, which corresponds to the SCC (Step S26**).

When receiving the "SCC reconfiguration instruction" from the call processing unit 12-0 that corresponds to the PCC, one, among the call processing units 12-1 to **12-*n*, which corresponds to the SCC, reconfigures the SCC according to the parameters that are retained, and resumes the outputting (Step S27**).

When receiving a message requesting a connection to a handover exchange destination from the mobile terminal 2 in response to the handover message to the mobile terminal (Steps S28), the call processing unit 12-0 that corresponds to the PCC transmits "handover completion" to the control unit 15 (Step S29).

When receiving the "handover completion" from the call processing unit 12-0 that corresponds to the PCC, the control unit 15 transmits the "transmission and reception level changing instruction" to the wireless hardware control unit 11 in order to return the PCC transmission and reception level to a level that is available with setting parameters (Step S30).

When receiving the "transmission and reception level changing instruction" from the control unit 15, the wireless hardware control unit 11 changes the transmission and reception level to a level that is assigned (Step S31). Having completed the change, the wireless hardware control unit 11 transmits the "processing completion" to the control unit 15 (Step S32).

Figure 4:
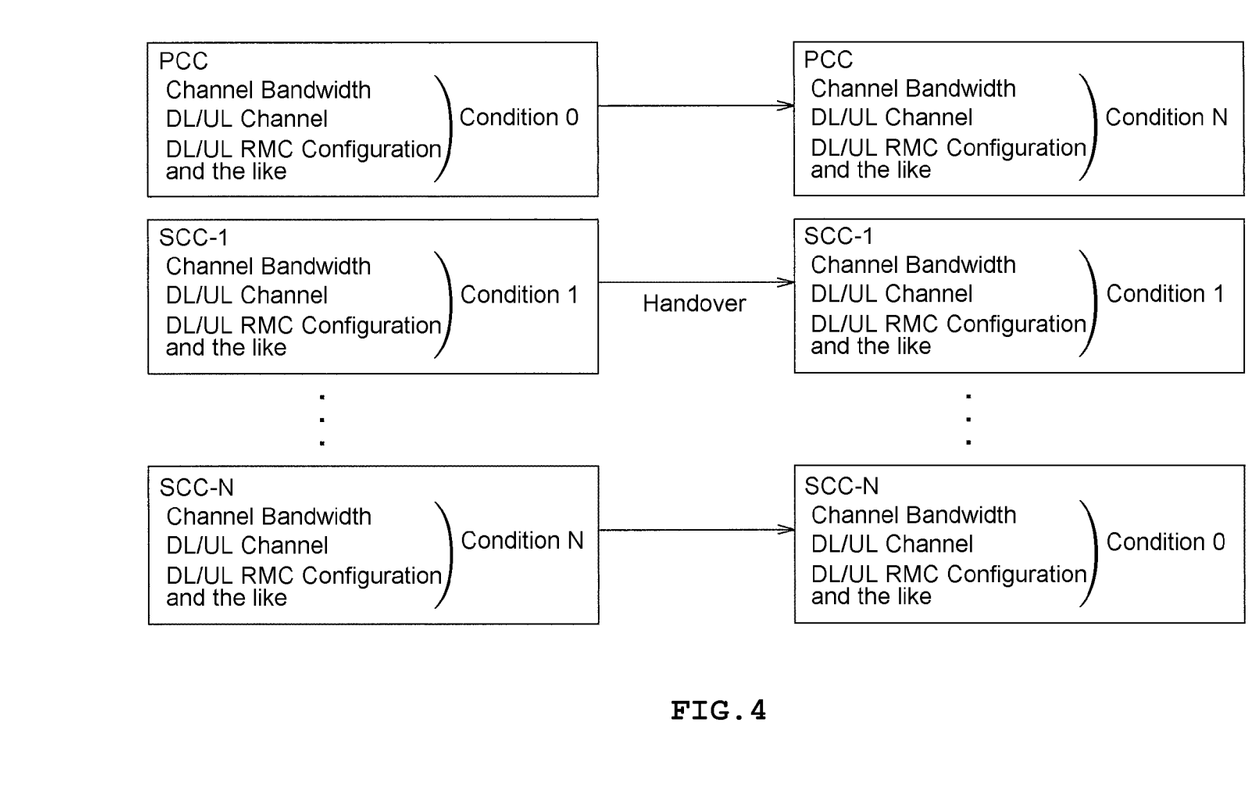
FIG. 4 is a diagram illustrating a change that results from parameter replacement by the mobile terminal test apparatus according to the embodiment of the present invention.

An operation that is performed by the parameter replacement processing describe above is described referring to FIG. 4. As illustrated in FIG. 4, when testing in a state of the PCC and testing in a state of the SCC are performed with the CC parameters being set to "condition 0", for example, first, because the testing in the state of the PCC is performed, the CC on which setting to "condition 0" is performed is connected, as the PCC, to the mobile terminal 2, and the testing is performed.

After the testing is terminated in the state of the PCC, all the CCs have to be disconnected and to start over from the setting of the parameters in the related art.

In the mobile terminal test apparatus 1 according to the present embodiment, for example, when the PCC and the SCC-N are designated and the handover is performed, as illustrated on the right side of FIG. 4, the parameters for the SCC-N are set to "condition 0", the parameters for the PCC are set to "condition N", and the testing can be performed in an SCC state with parameters being set to "condition 0".

In this manner, according to the embodiment described above, the control unit 15 is included that causes the mobile terminal 2 to perform the handover, causes the parameters for the designated SCC to be applied as the parameters for the PCC that is a handover destination, applies the parameters for the pre-handover PCC, and thus connects the SCC.

Accordingly, when the PCC testing and the SCC testing are switched, the simplicity of the testing can be improved and the testing time can be shortened without the need for the processing to start over from the setting of the parameters.

Furthermore, the control unit 15 causes one, among the call processing units 12-1 to 12-n, which corresponds to the SCC, to stop output of the SCC, before performing the handover.

Accordingly, an SCC signal can be prevented from interfering with a PCC signal. Furthermore, the handover is reliably performed and thus the testing time can be shortened.

Furthermore, the control unit 15 causes the call processing units 12-0 that corresponds to the PCC, to change a PCC reception level to a level suitable for the signaling, before performing the handover.

Accordingly, when the PCC transmission and reception level is changed to the level suitable for the signaling, the handover is reliably performed and the testing time can be shortened.

Furthermore, the control unit 15 may replace only some of the parameters for the PCC and for the SCC.

Accordingly, with the replacement of only some of the parameters, the processing terminates, and the testing time can be shortened. Furthermore, if the control unit 15 is set to notify the call processing units 12-0 to 12-n of only the parameters to be replaced, the amount of information that is transferred between the control unit 15 and each of the call processing units 12-0 to 12-n can be reduced.

The embodiment of the present invention is disclosed, and it is apparent to a person of ordinary skill in the related art that modifications to the embodiment are possible within the scope that does not depart from the nature and gist of the present invention. All of these modifications and equivalents are intended to be included in the following claims.

DESCRIPTION OF REFERENCE NUMERALS AND SIGNS

1 MOBILE TERMINAL TEST APPARATUS
2 MOBILE TERMINAL
10 WIRELESS SIGNAL PROCESSING UNIT
11 WIRELESS HARDWARE CONTROL UNIT
12-0 TO 12-n CALL PROCESSING UNIT
13 WIRELESS SIGNAL MEASUREMENT UNIT
14 USER INTERFACE UNIT
15 CONTROL UNIT
141 INPUT UNIT
142 DISPLAY UNIT

What is claimed is:

1. A mobile terminal test apparatus that, based on parameters that are set for each of multiple component carriers in a carrier aggregation, performs a call connection to a mobile terminal and performs carrier aggregation testing, with one among the multiple component carriers being set to be a primary component carrier and with the other component carriers being set to be secondary component carriers, the mobile terminal test apparatus comprising:
a control unit that causes the mobile terminal to perform a handover, and that connects one component carrier, which is connected as the secondary component carrier before the handover is performed, as the primary component carrier based on parameters that are set for the secondary component carrier, and connects a component carrier, which is connected as the primary component carrier before the handover is performed, as the secondary component carrier based on the parameters that are set for the primary component carrier.

2. The mobile terminal test apparatus according to claim 1,
wherein the control unit stops output of the secondary component carrier before the handover is performed.

3. The mobile terminal test apparatus according to claim 1,
wherein the control unit changes a transmission and reception level of the primary component carrier before the handover is performed.

4. The mobile terminal test apparatus according to claim 1,
wherein the control unit performs the handover and replaces some parameters that are set for one component carrier among the secondary component carriers by some parameters that are set for the primary component carrier.

5. A parameter replacement method for use in a mobile terminal test apparatus that, based on parameters that are set for each of multiple component carriers in a carrier aggregation, performs a call connection to a mobile terminal and performs carrier aggregation testing, with one among the multiple component carriers being set to be a primary component carrier and with the other component carriers being set to be secondary component carriers, the parameter replacement method comprising:
transmitting a handover message to the mobile terminal;
connecting one component carrier, which is connected as the secondary component carrier before the handover is performed, as the primary component carrier based on parameters that are set for the secondary component carrier; and
connecting a component carrier, which is connected as the primary component carrier before the handover is performed, as the secondary component carrier based on the parameters that are set for the primary component carrier.

6. The parameter replacement method according to claim 5, further comprising:
stopping output of the secondary component carrier before the handover message is transmitted to the mobile terminal.

7. The parameter replacement method according to claim 5, further comprising:
changing a transmission and reception level of the primary component carrier before the handover message is transmitted to the mobile terminal.

* * * * *